March 1, 1927.  A. C. VANCE  1,619,448
FISHING REEL
Filed March 20, 1926
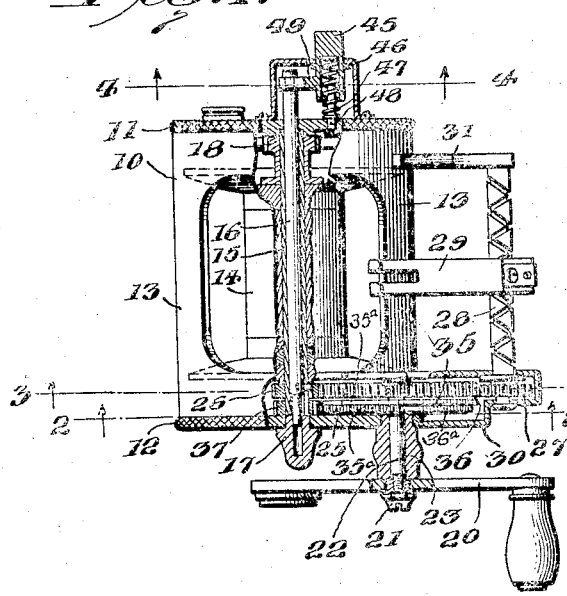
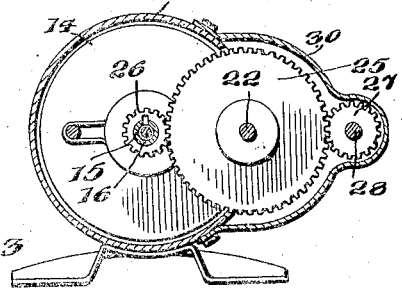
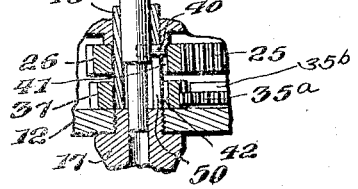
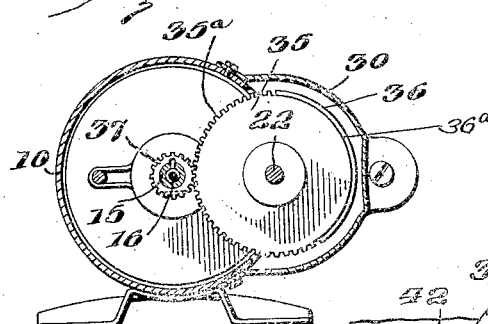
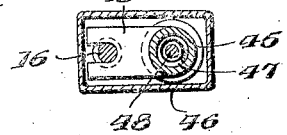
Inventor
Arthur C. Vance,
By Mauro, Cameron, Lewis & Kirkam
Attorneys Patented Mar. 1, 1927.

1,619,448

UNITED STATES PATENT OFFICE.

ARTHUR C. VANCE, OF BROOKLYN, NEW YORK.

FISHING REEL.

Application filed March 20, 1926. Serial No. 96,239.

This invention relates to fishing reels.

In fly fishing with pole and line it is sometimes desirable to move the bait along the surface of the water with an intermittent movement in simulation of the movement of a live insect. An object of the present invention is to provide a fishing reel wherein continuous rotation of the winding handle will impart intermittent rotation to the winding spool or drum and by thus winding up the line intermittently will also impart intermittent movement to the fly bait at the end of the line along the surface of the water. A further object is to provide a fishing reel in the use of which continuous rotation of the handle will either continuously rotate the spool, or intermittently rotate it, as desired.

The aforesaid and still other objects and advantages are attained by the embodiment of the invention illustrated in the accompanying drawing, wherein—

Fig. 1 is a top plan view with parts in horizontal section;

Fig. 2 is a vertical sectional view on line 2—2, of Fig. 1;

Fig. 3 is a vertical sectional view on line 3—3, of Fig. 1;

Fig. 4 is a sectional view on line 4—4, of Fig. 1, and

Figs. 5 and 6 are detail views.

The reel frame or casing includes a tubular body 10 closed at its ends by end-plates 11 and 12 respectively. Large openings formed through the wall of body 10, for the passage of and access to the line, are separated by the remaining wall portions or bars 13. 14 is the winding drum or spool rotatably supported on a tubular shaft 15. A bar 16 extends entirely through and supports said shaft 15, said bar at one end projecting through a supporting bearing in end-plate 11. At its other end shaft 16 projects into a supporting bearing or socket in a cap-nut 17 which is screw-threaded into an opening through end-plate 12, the shaft 16 being thus supported in a manner permitting of endwise sliding movement thereof back and forth within the tubular shaft 15. One end of tubular shaft 15 seats in a recess in end-plate 11, while its other end abuts against the inner end of cap-nut 17. The spool 14 may be fixed to tubular shaft 15, but preferably there is an interposed clutch connection (not shown) such, for example, as that shown in U. S. Patent 929,867 of Aug. 3, 1909, to Meisselbach and Catucci, whereby the spool will be clutched to and rotated with said shaft when the latter is rotated in a direction to wind up the line, but said spool will be released from and free to rotate independently of said shaft in the opposite or unwinding direction of rotation of the spool. A toothed wheel 18 fixed to the spool to rotate therewith constitutes part of the usual click-mechanism such as shown, for example, in U. S. Patent 845,805 of March 5, 1907, to Meisselbach.

20 is the winding crank or handle fastened by a nut 21 to the outer end of a short shaft 22 which extends through and is rotatable in a bearing-sleeve 23, said sleeve being screw-threaded or riveted at one end through end-plate 12. Two gear-wheels 25 and 35 are fixed on the inner end of shaft 22. The gear-wheel 25 is of usual formation with gear-teeth extending all the way around its periphery and meshing with a pinion 26 rotatable on the end of tubular shaft 15, and also with a pinion 27 on the shaft 28 of the well-known standard type of line guide 29 which is moved back and forth by rotation of said shaft to evenly spread or distribute the winding of the line onto the spool. A cap-section 30 of the casing encloses gears 25 and 35 and pinion 27 and also supports shaft 28 at one end thereof. At its other end shaft 28 is supported by and journaled in a bracket-arm 31 on the frame or casing.

As shown, the gear-wheel 35 has gear-teeth 35$^a$ around a little more than one-half of its periphery and around the rest of said periphery an untoothed smooth surface 36. Alongside the gear-teeth 35$^a$ there is a smooth peripheral surface 35$^b$ of less radius; and alongside smooth peripheral surface 36 there is a smooth peripheral surface 36$^a$ of less radius. Smooth surface portions 35$^b$ and 36$^a$, as shown, are of equal radius. Said gear-teeth 35$^a$ mesh with a pinion 37 rotatable on the end of shaft 15 and said smooth surface 36 is adapted to oppose a flattened surface portion 38, Fig. 6, on said pinion 37 and thereby lock the latter against rotation. As thus appears, in that portion of the rotation of gear 35 during which its teeth 35ª are in mesh with pinion 37 the latter will be rotated and will in turn rotate the spool through a clutch or key connection about to be described; but while the portion 36 of the peripheral surface of the gear 35 is passing pinion 37 in opposition to the flattened surface 38 of the pinion, there will be no rotation of pinion 37 and it will be locked against rotation, as shown in Fig. 6.

Means are provided whereby either pinion 26 or 37 may, at the will of the user of the reel, be connected to the tubular shaft 15 as the means of actuating it to rotate the spool in the winding-up direction. A lug, pin or key 40, Fig. 5, projects from shaft 16 through a slot 50 of tubular shaft 15 and into a key-way or groove 41 of pinion 26, as shown in Figs. 1 and 5, or into a similar key-way or groove 42 of pinion 37, according to the position to which the shaft 16 is shifted endwise by means next described. 45 is a plunger or push-button slidable in an opening through an enclosing cap 46 secured to end-plate 11, said push-button being normally held out by a spring 47 on a pin 48. An arm 49 on the push-button 45 has a forked outer end engaging a groove around the end of shaft 16.

In operation, the normal position of the parts is that shown in Figs. 1 and 5, with the push-button 45 held out by its spring 47, and shaft 16 in the position in which its key 40 engages groove 41 of pinion 26 thus locking the latter to shaft 15. With the parts so positioned continuous rotation of the handle 20 in the winding-up direction will continuously rotate the spool 14 and wind up the line. Pressure upon button 45 moving it inward against the pressure of its spring, will slide shaft 16 longitudinally, thereby moving key 40 along slot 50 and out of engagement with groove 41 in pinion 26 and into engagement with groove 42 in pinion 37. The pinions 37 being thus keyed or locked to shaft 15, continuous rotation of the handle 20 in the winding-up direction will intermittently rotate spool 14 and wind up the line. In other words, while the teeth 35ª of gear-wheel 35 are passing pinion 37 the latter will be rotated and in turn rotate the spool, but while the smooth portion 36 of the periphery of gear 35 is passing the flattened surface 38 of pinion 37, there will be no rotation of said pinion and of the spool. As soon as pressure upon button 45 is released the parts will resume their normal positions shown in Figs. 1 and 5. Thus, under control of the push-button 45, continuous rotation of the handle 20 will wind up the spool and line either by continuous or intermittent rotation as may be desired for the success of the sport.

What is claimed as new is:

1. In a fishing reel, the combination of a spool on which the line is to be wound; a winding handle; and means intermittently rotating said spool by continuous rotation of said handle.

2. In a fishing reel, the combination of a spool on which the line is to be wound; a winding handle; and means for rotating said spool either continuously or intermittently by continuous rotation of said handle.

3. In a fishing reel, the combination of a spool on which the line is to be wound; a winding handle; driving means for rotating said spool either continuously or intermittently by continuous rotation of said handle; and manually operable control means for determining whether said driving means are to rotate the spool intermittently or continuously by continuous rotation of the winding handle.

4. In a fishing reel, the combination of a spool on which the line is to be wound; a winding handle; gearing between said handle and spool to rotate the spool either intermittently or continuously by continuous rotation of the handle; and manually operable control means which control whether said gearing is to rotate the spool intermittently or continuously by continuous rotation of the handle.

5. In a fishing reel, the combination of a spool on which the line is to be wound; a winding handle at one end of the reel; driving means for rotating said spool either continuously or intermittently by continuous rotation of said handle; and control means for determining whether said driving means are to rotate the spool intermittently or continuously by continuous rotation of the winding handle, said control means including a manually operable part positioned at the end of the reel opposite that at which the winding handle is located.

6. In a fishing reel, the combination of a spool on which the line is to be wound; a winding handle at one end of the reel; driving means for rotating said spool either continuously or intermittently by continuous rotation of said handle; and manually operable control means for determining whether said driving means are to rotate the spool intermittently or continuously by continuous rotation of the winding handle, said control means including a longitudinally shiftable shaft or bar extending centrally through the spool.

7. In a fishing reel, the combination of a frame or casing including end plates at opposite ends thereof; a spool rotatably mounted in said frame; a winding handle on one of said end plates; driving means for rotating said spool either continuously or intermittently by continuous rotation of said handle, and control means for determining whether said driving means are to rotate the spool intermittently or continuously by continuous rotation of the winding handle, said control means including a manually operable part on the end plate opposite to that on which the handle is located.

8. A fishing reel, the combination of a spool on which the line is to be wound; a winding handle; and gearing between said handle and spool to rotate the spool intermittently by continuous rotation of the handle.

In testimony whereof I have signed this specification.

ARTHUR C. VANCE.